United States Patent [19]

Reimann et al.

[11] Patent Number: 4,705,634

[45] Date of Patent: Nov. 10, 1987

[54] PROCESS AND APPARATUS FOR THE BIOLOGICAL PURIFICATION OF WASTEWATER

[75] Inventors: Hans Reimann, Munich; Alfred Wildmoser, Haar, both of Fed. Rep. of Germany

[73] Assignee: Linde Aktiengesellschaft, Wiesbaden, Fed. Rep. of Germany

[21] Appl. No.: 832,782

[22] Filed: Feb. 26, 1986

[30] Foreign Application Priority Data

Feb. 26, 1985 [DE] Fed. Rep. of Germany ....... 3506687

[51] Int. Cl.[4] ................................................ C02F 3/08
[52] U.S. Cl. .................................. 210/616; 210/151; 210/195.3; 210/627
[58] Field of Search ................................ 210/616–618, 210/150, 151, 621–627, 620, 608, 195.3, 197, 320, 202, 291, 292

[56] References Cited

U.S. PATENT DOCUMENTS 1,979,197 10/1934 Harf ...................................... 210/291
2,071,591 2/1937 Tholin .................................. 210/616
2,465,658 3/1949 Nussberger ......................... 210/624
3,054,602 9/1962 Proudman .......................... 210/220
3,133,017 5/1964 Lambeth ............................. 210/197
4,098,695 7/1978 Novotny ............................. 210/292
4,566,971 1/1986 Reimann et al. .................... 210/616

FOREIGN PATENT DOCUMENTS 53-115563 10/1978 Japan .................................. 210/618
54-13665 2/1979 Japan .................................. 210/616
59-115789 7/1984 Japan .................................. 210/616

Primary Examiner—Benoit Castel
Attorney, Agent, or Firm—Millen & White

[57] ABSTRACT

In a process for the biological purification of wastewater, the wastewater is mixed with activated sludge in an aeration basin in the presence of carrier particles for microorganisms and is aerated with an oxygen-containing gas. Treated wastewater and free activated sludge are discharged from a discharge zone of the aeration basin downstream of an initial zone at least 20% up to 70% of the length of the aeration basin.

24 Claims, 2 Drawing Figures

4,705,634

PROCESS AND APPARATUS FOR THE BIOLOGICAL PURIFICATION OF WASTEWATER

BACKGROUND OF THE INVENTION

This invention relates to the biological purification of wastewater by mixing the wastewater with activated sludge in an aeration basin in the presence of carrier particles for microorganisms. Such mixtures are aerated with an oxygen-containing gas. Subsequently, the treated wastewater and free activated sludge are discharged from the aeration basin while retaining the carrier particles. Additionally, this invention relates to aeration basins which are used to treat wastewater with activated sludge and carrier particles.

The specific gravity, the size and the macropore properties of these open-cell foam carrier particles are in such a combination that they readily rise and drop in an aeration basin's mixing currents and, therefor, enhance the rate of mass transfer.

A major problem, however, with the use of carrier particles in activated sludge aeration basins has been that the flow of the wastewater-activated sludge mixture from the feed inlet toward the outlet of the aeration basin, results in a gradual conveyance of the carrier particles toward the outlet zone. Thereby, a relatively high concentration of the carrier particles is created near the outlet. This effect results in two apparent disadvantages. First, aeration basin outlets are usually equipped with a screen or perforated plate or similar means for retaining the carrier particles. Consequently, during the course of time, the carrier particles tend to clog or block the outlet. A second deleterious consequence is that the carrier particles are no longer present in adequate numbers in the inlet zone of the aeration basin. At the inlet zone, a high biomass concentration is most desirable.

SUMMARY OF THE INVENTION

An object of the invention is to provide a process which will mitigate the problems discussed above. An additional object is to provide an apparatus for conducting the process. Further objects are to provide substantially uniform distribution of freely suspended carrier particles and to reduce clogging of retaining screens.

Upon further study of the specification and appended claims, further objects and advantages of this invention will become apparent to those skilled in the art.

The objects are attained according to this invention in a process aspect thereof by the following: wastewater and sludge are introduced at the beginning of the flow path of the aeration basin, and after treatment in a so-called initial zone of the flow path, treated wastewater and free activated sludge are withdrawn from the aeration basin. The withdrawal zone is distributed over the remaining length of the flow path.

Since, in this operating mode, the wastewater-activated sludge mixture is not withdrawn from the aeration basin at a single point at the end of the flow path, but rather is distributed along a portion of the flow path, excessive transport of the carrier particles to the end of the flow path of the aeration basin is at least extensively mitigated. Thereby, a substantially uniform distribution of the carrier particles can be maintained with the aid of the turbulence existing in the aeration basin caused by the aeration and intermixing between wastewater and sludge.

In order to maintain a uniform distribution, it is useful, in this connection, to effect aeration of the wastewater-activated sludge mixture in such a way that a circulating current of the wastewater is produced about a horizontal axis extending from the beginning of the flow path to the end of the flow path. Additionally, the aerating gas supply is reduced at least approximately in the last third of the flow path, as compared with the aerating gas volume supplied at the beginning of the flow path. In this way, the carrier particles suspended in the wastewater can be conveyed from the very end of the flow path to the initial zone of the flow path without additional measures. This result occurs because carrier particles floating in the wastewater will be transported, in case of two adjacent circulating-current sections generated by means of differing quantities of gas, along the common horizontal circulation axis from the circulating-current section generated with lower gas quantities to the circulating-current section generated with higher gas quantities.

Preferred carrier particles proved to be, organopolymeric particles of a low specific gravity and having an open-cell structure, a size of 5–50 mm, open macropores of 0.1–3 mm and a specific gravity in the dry condition of 10–200 kg/m$^3$, preferably 30–100 kg/m$^3$. Such carrier particles readily float in the wastewater and offer the microorganisms a large surface for attachment which extends into the interior of the particles on account of their open-cell structure. Additionally, such particles also are capable of ascending and descending into regions of differing hydrostatic pressure due to wastewater and aerating gas currents. One result of such propertries is that the rate of mass transfer is intensified. A further advantage of the open-cell structure is that it permits extensive self-cleaning of the carrier particles insofar as the gas bubbles produced by the microbiological processes in the interior of the carrier particles exit through the duct system of the carrier particles. This duct system is formed as a result of the open-cell structure and when subjected to suitable hydrostatic pressure changes, flushes free any excess microoganisms.

Preferred materials for the carrier particles are, for example, polyurethane, polyethylene, polypropylene, silicone polymers, or mixtures of two or more of these materials. However, it is of course also possible to utilize carrier particles from other materials fulfilling the indicated conditions.

It is advantageous to begin the withdrawal of treated wastewater and free activated sludge after an initial zone of the flow path encompassing 30–80%, preferably 30–50%, of the entire flow path. With such a size of the initial zone, it is ensured that, with supplying wastewater and sludge at the beginning of the flow path of the aeration basin and with an adequate oxygen content in the wastewater, the primary breakdown as well as absorption of the wastewater ingredients will have been concluded at the point where withdrawal of wastewater and free activated sludge is initiated. Since the withdrawal is effected broadly throughout the length of the flow path remaining after the initial zone, which constitutes advantageously 20–70% and preferably 50–70% of the entire flowpath, the average treated wastewater discharged carries a load only slightly higher than an unmodified aeration basin where wastewater and free activated sludge are discharged only at the outlet end of the basin. This is due to the fact that if wastewater and free activated sludge are withdrawn as described, the breakdown of the remaining wastewater ingredients is intensified, as seen over the length of the discharge zone, because for a part of the wastewater-activated sludge mixture the contact time is prolonged.

In this connection, it is possible in another advantageous embodiment of this invention to effect the discharge of treated wastewater and free activated sludge either uniformly over the length of the flow path provided for this purpose or in decreasing quantities. Concomitant with uniform withdrawal, is that the carrier particles are also distributed uniformly over the discharge zone. In contrast thereto, if the withdrawal of wastewater and sludge is effected with decreasing quantities, less carrier particles are transported to the downstream terminus of the flow path thereby facilitating the returning of the carrier particles, by virtue of the turbulence present in the aeration basin, to the initial zone of the oxygenation tank. Another advantage with this "decreasing" mode of operation is that more carrier particles and thus a high biomass concentration are available in the initial zone of the aeration basin where a maximum of biomass is necessary for the primary breakdown of the wastewater ingredients.

It is furthermore advantageous to maintain, in the region of the withdrawal of treated wastewater and free activated sludge, mixing currents with vertical components, ascending and/or descending, of wastewater and/or gas. It is thus possible in a simple way to superimpose, on the current directed from the inlet toward the outlet zone, a vertical current which flushes away the carrier particles that collect near an outlet retainer. These vertical currents can be generated, for example, by introducing the treatment aerating gas through distributors, i.e., openings designed as discharge tubes, porous plates, or jet nozzles, arranged in a straight line parallel to the treatment flow path in the proximity of the bottom of the aeration basin. These aerating gas inlet openings can be located either along the center line or along one or both sidewalls of the aeration basin.

An apparatus for performing the process of this invention comprises an aeration basin wherein carrier particles for microorganisms are provided and which includes a wastewater feed conduit, a sludge feed conduit, a discharge conduit for treated wastewater and free activated sludge, gas introducing means for an oxygen-containing treatment gas, as well as retaining means for the carrier particles.

According to this invention, such an apparatus is characterized in that the wastewater feed conduit and the sludge feed conduit are connected to the aeration basin at the beginning of the flow path; the discharge conduit for treated wastewater and free activated sludge is connected to discharge means arranged in the aeration basin and the discharge means extend, downstream of an initial zone of the flow path, over the length of the remaining flow path of the aeration basin. Thus, with a simple structure of the device, a uniform distribution of the carrier particles is ensured.

In this connection, it is advantageous for the discharge means to comprise perforated plates and/or mesh screens and to adapt the size and the distribution of the perforation and/or meshwork to the desired distribution of the drainage of the treated wastewater and free activated sludge. If, for example, a reduction in the amount of wastewater and activated sludge to be withdrawn is desired over the length of such drainage elements, then the hole diameter or, alternatively, the number of holes, can decrease along the length of the drainage elements. In this arrangement, the discharge means comprises either perforated pipes below the liquid level or perforated overflow channels.

In order to obtain adaption of the discharge means to varying operating conditions of the aeration basis, it is furthermore advantageous for the discharge means to be variable in length and/or position.

In order to flush the drainage elements free of any accumulating carrier particles, it is furthermore advantageous to arrange the discharge elements in the zone of ascending and/or descending wastewater and/or aerating gas currents. For this purpose, aeration devices can be provided in close proximity to the tank bottom in a straight line underneath and parallel to the drainage elements or, alternately, the discharge elements can be associated with one sidewall and the aeration devices with the other sidewall close to the bottom of the aeration basin.

It is also advantageous to arrange a baffle in the initial zone of the flow path of the oxygenation tank. This baffle has the task of preventing short circuiting of wastewater and activated sludge and thus the rapid movement of carrier particles from the beginning of the flow path to the discharge elements. The baffle also serves the purpose of smoothing the flow, proximate the wastewater and recycle sludge inlet conduits.

BRIEF DESCRIPTION OF DRAWING

A preferred embodiment of a system for conducting the process of this invention is shown schematically in the drawing wherein.

DETAILED DESCRIPTION OF FIGURES

Figure 1:
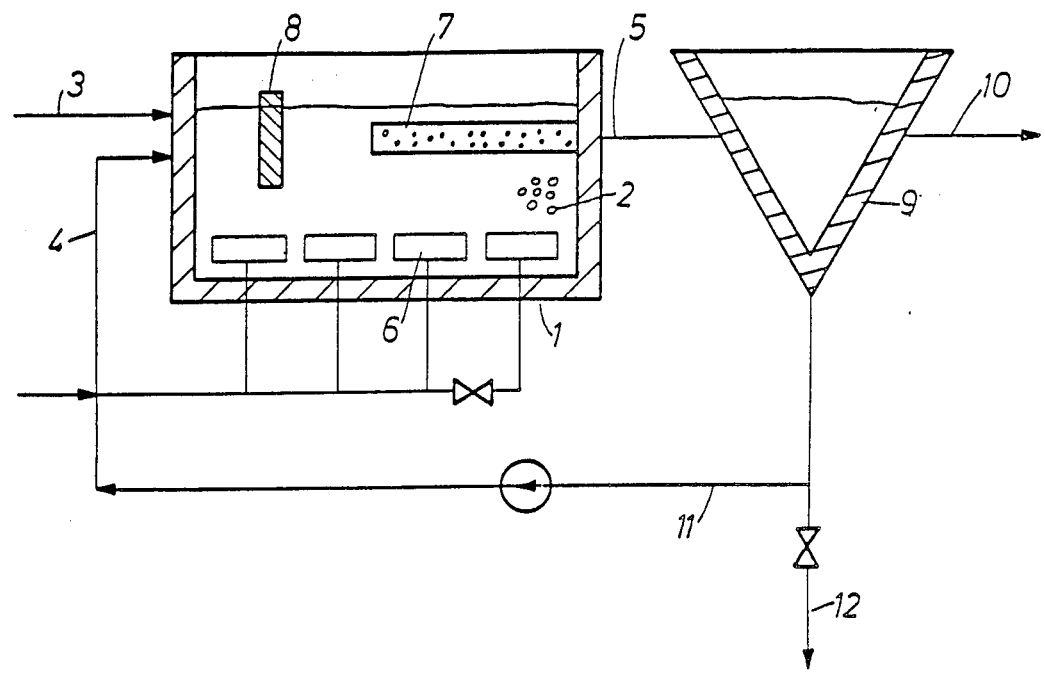
FIG. 1 shows an activated sludge installation with aeration basin and an associated clarifier.

In the figures, 1 denotes an aeration basin or oxygenation tank with longitudinal throughflow. Carrier particles 2 for microorganisms are provided in the aerator basin 1 in such a number that they can still float freely movably in the wastewater-activated sludge mixture. As has been found, a carrier particle proportion amounting to about 40% of the volume of the aeration basin is preferred especially with the use of carrier particles of organic polymer compounds having a size of 5–50 mm, with open-cell macropores of 0.1–3 mm and with a specific gravity in the dry condition of 10–200 kg/m$^3$. With this design, and this amount of carrier particles, the latter can ascend and descend in the wastewater-activated sludge mixture by virtue of the existing currents. During this process, the carrier particles are subjected to varying hydrostatic pressures whereby mass transfer is intensified and the channels formed by the open-cell structure in the interior of the carrier particles can be kept free of excess biomass with the aid of exiting aerating gas bubbles.

Via a wastewater feed conduit 3, the wastewater to be treated and, via a sludge feed conduit 4, the required activated sludge, are fed into the aeration basin 1. Treated wastewater is discharged via a discharge conduit 5, together with free activated sludge, into a clarifier 9.

Clarified wastewater is withdrawn by way of conduit 10 from the clarifier 9 while settled sludge is withdrawn from the clarifier via a sludge recycling conduit 11, as return activated sludge, and delivered to the return activated sludge feed conduit 4 of the aeration basin 1. Excess or waste sludge is taken from the system via a sludge discharge conduit 12 connected to the sludge recycling conduit 11.

Due to the return of activated sludge via the sludge recycling conduit 11, free activated sludge is also present in the aeration basin besides the activated sludge which is fixed on the carrier particles 2. In this way, an extremely high biomass concentration can be maintained, e.g., in a range from 6 to 15 g/l.

Figure 2:
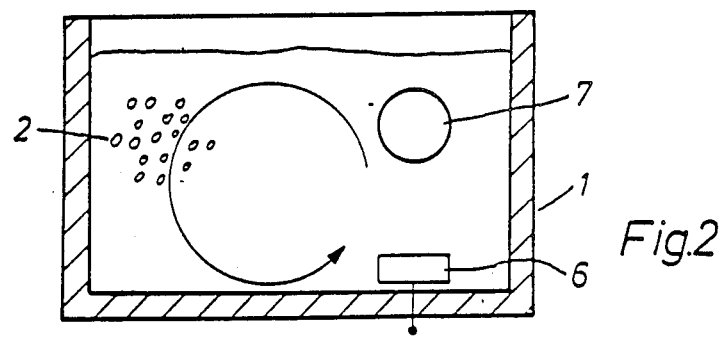
FIG. 2 is a cross section through the aeration basin.

For supplying the microorganisms of the activated sludge with oxygen, aerating gas introduction devices 6 are provided which can be designed as porous plates, discharge pipes or nozzles, with air or oxygen-enriched air being injected thereby in the proximity of the bottom of the tank. The aerating gas introduction devices 6, as can be seen from FIG. 2, are installed in this embodiment only along the right-hand sidewall of the aeration basin 1, whereby a circulatory motion of the wastewater about a horizontal axis of the aeration basin 1 is produced with the aid of the rising aerating gas bubbles, as indicated by the arrow shown in FIG. 2. As illustrated in FIG. 1, the aerating gas introduction means, i.e., a distributor 6, can be provided approximately along the last third of the length of the aeration basin with the capability being shut off or at least throttled.

Above the aerating gas distributor 6, after an initial zone of the aeration basin 1 encompassing 30% to 80% of the length of the aeration basin 1, discharge means comprising drainage elements 7 are disposed, by way of which wastewater and free activated sludge are withdrawn over the remaining length of the aeration basin 1. The drainage elements 7 comprise, for example, telescopable, perforated pipes located below the liquid level and connected to the outlet conduit 5 for treated wastewater and free activated sludge. By arrangement above the gas distributor 6, the drainage elements 7 are surrounded by rising aerating gas and liquid currents and thus are kept free of any carrier particles 2 that may collect at that location.

By virtue of the fact that the withdrawal of wastewater and free activated sludge is distributed over the length of the flow path in the aeration basin 1, it is possible to forestall a large proportion of the carrier particles 2 from being gradually transported to the end of the flow path. Thereby, with the aid of the turbulence existing in the aeration basin 1, a uniform distribution of the carrier particles can be readily maintained.

For enhancing uniform distribution, at least the aerating gas distributor present in the last third of the aeration basin 1 can, if necessary, be either completely shut off or throttled back with respect to the other upstream aerating gas distributor. Since carrier particles floating in the wastewater migrate, in case of two neighboring circulating-flow sections generated by differing amounts of gas, along the common horizontal circulation axis from the circulating-flow section generated by lower amounts of aerating gas to the flow section produced by higher amounts of aerating gas, a back flow of carrier particles can be achieved in this way.

To impede migration of the carrier particles 2 present in the aeration basin 1 toward the outlet end of the aeration basin 1 (such migration being otherwise caused by the circulation resulting from the wastewater feed in conduit 3 and recycled sludge in conduit 4) a baffle 8 is arranged in the initial zone of the oxygenation tank 1 close to the connection point of the wastewater feed conduit 3 and the sludge feed conduit 4. This baffle is preferably positioned from the inlet end in a distance of about 20-40% of the lengthwise dimension of the aeration basin and covers 50-75% of the basin cross section.

Without further elaboration, it is believed that one skilled in the art can, using the preceding description, utilize the present invention to its fullest extent.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological purification of a wastewater wherein said wastewater is mixed with acitivated sludge in an aeration basin having inlet and output ends and containing carrier particles for microorganisms, and is aerated with an oxygen-containing gas in a flowpath from the inlet to the outlet ends, and wherein treated wstewater and free activated sludge are discharged from the outlet end of said aeration basin while retaining said carrier particles in the aeration basin, the improvement which comprises:

feeding wastewater and sludge to the inlet end of the aeration basin, treating said wastewater in an initial zone of said flowpath and withdrawing resultant treated wastewater and free activated sludge along the length of a zone downstream of said initial zone, said downstream zone extending lengthwise from within the basin to the outlet end of the basin, said downstream zone having a downsream terminus at said outlet end and an upstream terminus sufficiently distant from the downstream terminus so as to form a lengthwise extended discharge zone of sufficient size to reduce clogging of the outlet end of the aeration basin, said initial zone comprising 30% to 80% of the entire flowpath and said discharge zone comprising 20% to 70% of the entire flowpath.

2. A process according to claim 1 wherein said initial zone comprises 30–50% of the flowpath and said discharge zone comprises 50–70% of the flowpath.

3. A process according to claim 1 wherein withdrawal of treated wastewater and free activated sludge is effected substantially uniformly over the length of the discharge zone.

4. A process according to claim 1 wherein the withdrawal of treated wastewater and free activated sludge is effected at a decreasing rate of discharge over the length of the discharge zone.

5. A process according to claim 1, wherein ascending and/or decending currents of wastewater and/or aerating gas are maintained in the region of withdrawal of treated wastewater and free activated sludge from said discharge zone.

6. A process according to claim 1 further comprising establishing a circular flow in said discharge zone, said circular flow having a horizontal axis in the direction of flow from the inlet to the outlet of said aeration basin.

7. A process according to claim 1, wherein said carrier particles are porous particles of organic polymer compounds having pores consisting essentially of open-cell macropores of 0.1-3 mm, said particles having a particle size of 5-50 mm and a specific gravity in the dry condition of 10-200 kg/mg. kg/mg.

8. A process according to claim 1, wherein the aeration basin has a biomass concentration of 6-15 g/l.

9. In an apparatus for purifying wastewater, comprising an aeration basin having inlet and outlet ends and containing carrier particles for microorganisms, a wastewater feed conduit, a sludge feed conduit, a discharge conduit for treated wastewater and free activated sludge, gas introducing means for an oxygen-containing treatment gas, and retaining means for the carrier particles, the improvement wherein said wastewater feed conduit and said sludge feed conduit are connected to said aeration basin at the inlet of said aeration basin; said discharge conduit for treated wastewater and free activated sludge is connected to discharge means arranged in the aeration basin and extending lengthwise in said aeration basin from the outlet end towards the inlet end of the aeration basin a distance of about 20–70% of the lengthwise dimension of the aeration basin, said discharge means comprising a lengthwise continuum of spaced or connected openings having a size less than said carrier particles.

10. An apparatus according to claim 9, wherein the discharge means comprise perforated plates and/or mesh screens.

11. An apparatus according to claim 9 wherein said discharge means are variable in length and/or position.

12. An apparatus according to claim 11 wherein said discharge means comprise telescopical perforated pipes.

13. An apparatus according to claim 11 further comprising gas distribution means in the aeration basin located proximate said discharge means.

14. An apparatus according to claim 13 wherein the gas distribution means are located below said discharge means.

15. An apparatus according to claim 13 wherein the discharge means extends lengthwise from the outlet end a distance of about 50–70% of the lengthwise dimension of the aeration basin.

16. An apparatus according to claim 9 further comprising:
a baffle arranged in said aeration basin proximate said inlet end.

17. An apparatus according to claim 16, wherein said baffle is positioned from the inlet end at a distance of about 20–40% of the lengthwise dimension of the aeration basin.

18. An apparatus according to claim 16, wherein said baffle comprises 50–75% of the aeration basin cross section.

19. In an apparatus for purifying wastewater comprising an aeration basin having inlet and outlet ends and containing carrier particles for microorganisms, a wastewater feed conduit, a sludge feed conduit, a discharge conduit for treated wastewater and free activated sludge, gas introducing means for an oxygen-containing treatment gas, and retaining means for the carrier particles; a clarifier having an inlet means in fluid communication with said discharge conduit of said aeration basin, a water withdrawal conduit, and a sludge outlet conduit; and a sludge recycle means in fluid communication with said sludge outlet conduit of said clarifier and said sludge feed conduit of said aeration basin for recycling activated sludge from said clarifier to said aeration basin; the improvement wherein said wastewater feed conduit and said sludge feed conduit are connected to said aeration basin at the inlet end of said aeration basin and said discharge conduit is connected to discharge means arranged in the aeration basin and extending lengthwise in said aeration basin from the outlet end towards the inlet end of the aeration basin said discharge means comprising a lengthwise continuum of spaced or connected openings having a size less than said carrier particles.

20. An apparatus according to claim 19 wherein the discharge means extends lengthwise from the outlet end a distance of about 50–70% of the lengthwise dimension of the aeration basin.

21. An apparatus according to claim 19 further comprising:
a baffle arranged in said aeration basin proximate said inlet end.

22. An apparatus according to claim 21, wherein said baffle is positioned from the inlet end at a distance of about 20–40% of the lengthwise dimension of the aeration basin.

23. An apparatus according to claim 21, wherein said baffle comprises 50–75% of the aeration basin cross section.

24. A process according to claim 4 further comprising establishing a circular flow in said discharge zone, said circular zone having a horizontal axis in the direction of flow from the inlet to the outlet of said aeration basin.

* * * * *